US010127786B1

(12) United States Patent
Lee

(10) Patent No.: US 10,127,786 B1
(45) Date of Patent: Nov. 13, 2018

(54) INTERNET PROTOCOL MONITOR SECURITY APPARATUS AND METHODS

(71) Applicant: Hon Ming Michael Lee, Hong Kong (HK)

(72) Inventor: Hon Ming Michael Lee, Hong Kong (HK)

( * ) Notice: Subject to any disclaimer, the term of this patent is extended or adjusted under 35 U.S.C. 154(b) by 0 days.

(21) Appl. No.: 15/644,999

(22) Filed: Jul. 10, 2017

(51) Int. Cl.
| | |
|---|---|
| G08B 23/00 | (2006.01) |
| G08B 21/02 | (2006.01) |
| G06F 21/44 | (2013.01) |
| F21V 33/00 | (2006.01) |
| H04M 1/66 | (2006.01) |
| H04W 24/00 | (2009.01) |
| G06Q 40/00 | (2012.01) |

(52) U.S. Cl.
CPC ...... *G08B 21/0205* (2013.01); *F21V 33/0024* (2013.01); *G06F 21/44* (2013.01); *G08B 21/023* (2013.01); *G08B 21/0277* (2013.01); *G08B 21/0283* (2013.01)

(58) Field of Classification Search
CPC .............. G08B 21/0205; G08B 21/023; G08B 21/0277; G08B 21/0283; F21V 33/0024; G06F 21/44
USPC ...................................................... 340/573.1
See application file for complete search history.

(56) References Cited

U.S. PATENT DOCUMENTS

| | | | | |
|---|---|---|---|---|
| 9,026,145 | B1 * | 5/2015 | Duleba | H04L 61/25 455/456.3 |
| 2011/0109640 | A1 * | 5/2011 | Lawrence | G09G 5/42 345/582 |
| 2013/0144784 | A1 * | 6/2013 | Yang | G06Q 20/12 705/44 |
| 2016/0248795 | A1 * | 8/2016 | Chien | H04L 63/1458 |
| 2016/0358432 | A1 * | 12/2016 | Branscomb | G08B 13/1965 |
| 2017/0245280 | A1 * | 8/2017 | Yi | H04K 3/00 |
| 2017/0310709 | A1 * | 10/2017 | Foxhoven | H04L 63/20 |
| 2017/0346851 | A1 * | 11/2017 | Drake | H04L 63/1466 |
| 2018/0121684 | A1 * | 5/2018 | Goldberg | G06F 21/81 |
| 2018/0146001 | A1 * | 5/2018 | Chien | H04L 63/1433 |

* cited by examiner

Primary Examiner — Jack K Wang

(57) ABSTRACT

A miniature Security Control Device is described for coupling a baby monitor and internet. For example, one embodiment of a miniature Security Control Device comprises: a housing having a compact form factor; a first network interface integrated within the housing to couple the Security Control Device to internet over a first communication channel; a second network interface integrated within the housing to couple the Security Control Device to a baby monitor over a second communication channel, the second communication channel being a local wireless communication channel; an alternating current (A/C) input interface to couple the miniature Security Control Device to an A/C power outlet; a transformer integrated within the housing to transform the A/C power from the A/C input interface into a lower voltage D/C signal; and at least one light emitting diode (LED) powered by the lower voltage D/C signal, the LED to notify a user of a current status of the Security Control Device and additionally configurable as a user-programmable night-light.

10 Claims, 7 Drawing Sheets

INTERNET PROTOCOL MONITOR SECURITY APPARATUS AND METHODS

FIELD OF THE INVENTION

The present disclosure relates generally to the field of computer systems, and specifically, to enhancing security of Internet protocol monitors.

BACKGROUND OF THE DISCLOSED TECHNOLOGY

Over the last few years, hackers have set their targets on Internet-connected baby monitors. They have hacked into baby monitors to scream at toddlers, to curse out their parents, and to turn them into spy cams. Key security considerations for home use products can be very different than that for business. Home users must not be presumed to have received any security training. Average home users may be technically incompetent, incapable of understanding product manuals, and reluctant to registering with product manufacturers. Difficult issues are identified based on observations made from reported baby monitor hacks in the past.

Expert advice too hard to follow—Following the most recent high-profile baby monitor hack, various experts have given two dozen or more best practices for home users to follow. Advices such as "set it up so that the configuration screens can only be accessed from your side of the network, either by plugging into one of the LAN (local-area network) ports on the back, or via Wi-Fi" [1], or "it should communicate only with a 'tier 1' server or a cloud hosting company, rather than strictly peer-to-peer" [2] are too technically challenging for average home users who are readily overwhelmed by jargons such as LAN vs WAN, or WIFI vs Cloud vs Tier 1.

Intrusion goes unnoticed—All widely available models offer little more than embedded event logs as a means for intrusion detection. Not only are these logs not easily accessible, but their use require analytical skills that is an unrealistic expectation of average home users.

Poor forensic design—Even after a parent obtains an embedded log after discovery of a hack, it still takes tremendous amount of technical skills to perform reverse geolocation lookup based on remote ip addresses in order to locate and report the intruders. It has also been reported the embedded logs get wiped out upon powering off in some models, which adds to the burden on home users who may risk losing all evidence by not following procedures.

Poor industrial design—While reports have always shown a recurring theme of vulnerabilities as a consequence of either actions or inactions of home users [4] [5], researchers have long recognized those actions and inactions as known behavior that better industrial design should be able to compensate for. For example, study has shown reluctance of registering products as an expected behavior of home users [6], and as such security considerations should take into account of home users not performing latest firmware upgrade, perhaps due to failure to register with manufacturers, or due to purchasing via a reseller.

Therefore, it is clear that industrial design for home use products require a different set of security considerations. Home network is assumed to be always vulnerable and never reliably secure, and thus a new solution is needed for securing use of baby monitor at home.

SUMMARY OF THE INVENTION

The presently disclosed Security Control Device automatically determines geolocation of remote authentication to baby monitors for forensic purpose, announces authentication events to raise awareness of potential hacks, and limiting authentication altering or creation capabilities to prevent hacking. The Security Control Device through which a Baby Monitor is coupled to the Internet. In addition, the design is to have no internet connected services, mobile or Web applications (e.g., executed on a client device) available through which the Security Control Device may be accessed and managed. A "hardware interlock" between the authentication memory area and the operating system is designed to ensure the Security Control Device cannot be compromised by hackers to alter and/or to add own username and password to the Security Control Device, in one embodiment, the "hardware interlock" is designed to establish a secure execution environment for executing authentication. This may be implemented, for example, by using TrustZone technology (available on some ARM processors) and/or Trusted Execution Technology (designed by Intel).

Configuration-less design is an important design factor that attributes to both human usability and also security safeguards. All a home user needs to do is to connect the Security Control Device with a baby monitor and it will just work without any additional configurations or changing default passwords. In fact, remote configuration changes to authentication is eliminated and blocked by design, resulting in device resilience and data integrity in a LAN environment wherein authentication of either the baby monitor and router(s) are potentially subject to being hacked. Authentication function and credential data for the execution of the Security Control Device is protected by the above mentioned hardware interlock technology. In addition, authentication event database can only be accessed and erased via touch buttons included with the Secure Control Device, protecting the database from potential remote hacking access via either internet or even local home network. Playback of authentication events can be listened to via built-in audio speakers. Reverse geolocation lookup are performed at real-time based on remote ip addresses of authentication to ensure accuracy of locations included in the database. The Security Control Device periodically announces the number of newly recorded events via the audio speakers as a reminder to playback.

A miniature Security Control Device is described for coupling a baby monitor and internet. For example, one embodiment of a miniature Security Control Device comprises: a housing having a compact form factor; a first network interface integrated within the housing to couple the Security Control Device to internet over a first communication channel; a second network interface integrated within the housing to couple the Security Control Device to a baby monitor over a second communication channel, the second communication channel being a local wireless communication channel; an alternating current (A/C) input interface to couple the miniature Security Control Device to an NC power outlet; a transformer integrated within the housing to transform the A/C power from the A/C input interface into a lower voltage D/C signal; and at least one light emitting diode (LED) powered by the lower voltage D/C signal, the LED to notify a user of a current status of the Security Control Device and additionally configurable as a user-programmable night-light.

DETAILED DESCRIPTION OF EMBODIMENTS OF THE DISCLOSED TECHNOLOGY

Figure 1:
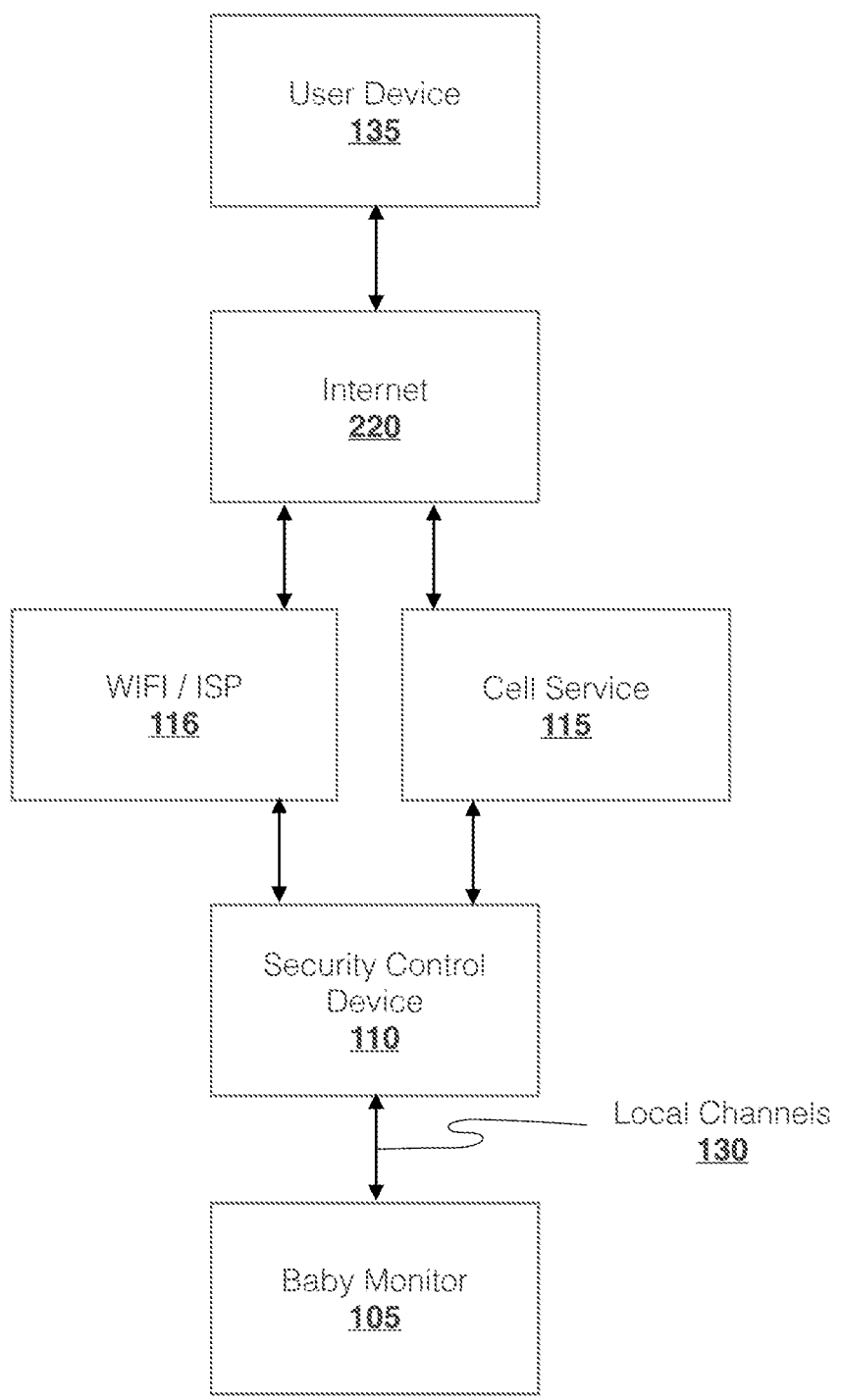
FIG. 1 illustrates different embodiments of an Security Control Device system architecture.

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

The presently disclosed Security Control Device automatically determines geolocation of remote authentication to baby monitors for forensic purpose, announces authentication events to raise awareness of potential hacks, and limiting authentication altering or creation capabilities to prevent hacking. This type of two-factor two-channel authentication security control has not been previously performed because the specific real-world behaviors captured described herein were not previously available to baby monitors.

One embodiment of the invention includes a Security Control Device through which a Baby Monitor is coupled to the Internet. In addition, the design is to have no internet connected services, mobile or Web applications (e.g., executed on a client device) available through which the Security Control Device may be accessed and managed. A "hardware interlock" between the authentication memory area and the operating system is designed to ensure the Security Control Device cannot be compromised by hackers to alter and/or to add own username and password to the Security Control Device. In one embodiment, the "hardware interlock" is designed to establish a secure execution environment for executing authentication. This may be implemented, for example, by using TrustZone technology (available on some ARM processors) and/or Trusted Execution Technology (designed by Intel). Of course, the underlying principles of the invention are not limited to any particular type of secure execution technology.

Configuration-less design is an important design factor that attributes to both human usability and also security safeguards. All a home user needs to do is to connect the Security Control Device with a baby monitor and it will just work without any additional configurations or changing default passwords. In fact, remote configuration changes to authentication is eliminated and blocked by design, resulting in device resilience and data integrity in a LAN environment wherein authentication of either the baby monitor or router(s) are potentially subject to being hacked. Authentication function and credential data for the execution of the Security Control Device is protected by the above mentioned hardware interlock technology. In addition, authentication event database can only be accessed and erased via touch buttons included with the Secure Control Device, protecting the database from potential remote hacking access via either internet or even local home network. Playback of authentication events can be listened to via built-in audio speakers. Reverse geolocation lookup are performed at real-time based on remote ip addresses of authentication to ensure accuracy of locations included in the database. The Security Control Device periodically announces the number of newly recorded events via the audio speakers as a reminder to playback.

The Security Control Device is designed to be a pass-through in regards to authentication data flow to a connected baby monitor. In preferred embodiments, Authentication events are simply recorded for forensic purpose. In alternative embodiments, and in addition, the control logic can be programmed to detect and block unauthorized authentication attempts, however doing so at the cost of extra complexity via API integration with baby monitor software.

FIG. 1 illustrates an overview of an architectural platform on which embodiments of the invention may be implemented. In particular, the illustrated embodiment includes a baby monitor 105 communicatively coupled over local communication channels 130 to a Security Control Device 110. The baby monitor 105 may be hard-wired to the Security Control Device 110. In one embodiment, data collected from a baby monitor may be made accessible to the end user via app or browser installed on the user's device 135 (or via a desktop or other client computer system) and to web clients.

In one embodiment, the Security Control Device 110 includes a cellular radio to establish a connection to the Internet 220 via plugging into one of the LAN (local-area network) ports of the WIFI router. Alternatively, or in addition, the Security Control Device 110 may include a WiFi radio to establish a WiFi connection through a WiFi access point or router 116 which couples the Security Control Device 110 to the Internet (e.g., via an Internet Service Provider providing Internet service to the end user).

In one embodiment, the baby monitor and the Security Control Device 110 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the baby monitor 105 and the Security Control Device 110 are equipped with Bluetooth LE radios and protocol stacks.

As mentioned, in one embodiment, an IoT app or Web application executed on user devices 135 allow users to access and configure the connected baby monitor 105. The same IoT app or Web application are not allowed to access and configure the connected Security Control Device.

In one embodiment, the Security Control Device 110-111 may establish a direct connection to the internet 220 through a cellular 115 or WiFi 116 connection (not explicitly shown in FIG. 1). Alternatively, or in addition, the Security Control Device 110 is equipped with a cellular communication interface to establish the connection to the internet 220. As such, all communication between the internet 220 and the other baby monitor 111 will flow through the master Security Control Device 110. The Security Control Device 110 and the baby monitor 111 may connect over a local network which may be a WiFi network 116, an Ethernet network, and/or a using power-line communications (PLC) networking (e.g., where all or portions of the network are run through the user's power lines), or Bluetooth LE, to name a few.

Figure 2:
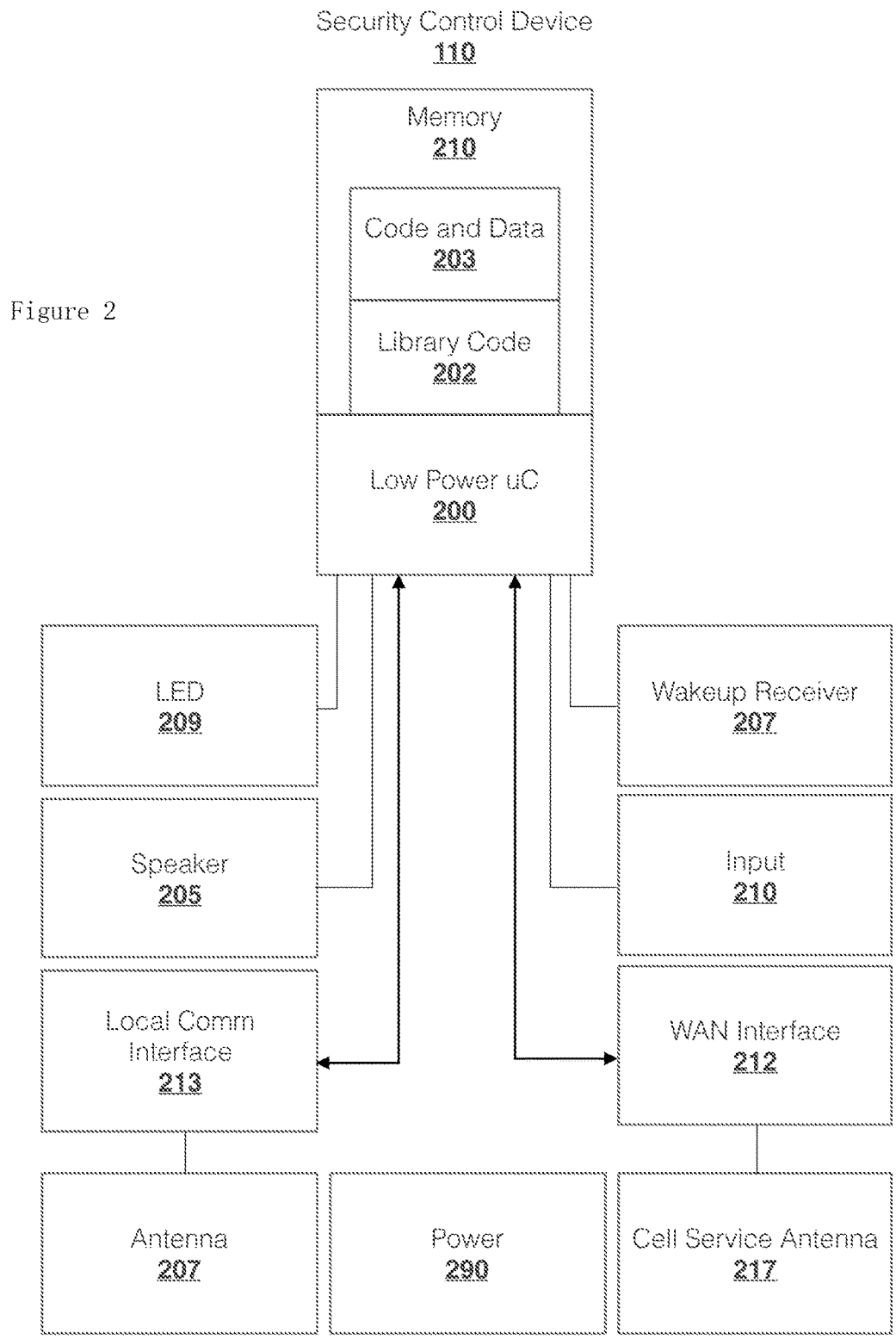
FIG. 2 illustrates a Security Control Device in accordance with one embodiment of the invention.

As illustrated in FIG. 2, the Security Control Device 110 includes a memory 210 for storing program code and data 203 and hardware logic 200 such as a microcontroller for executing the program code and processing the data. A wide area network (WAN) interface 212 and antenna 217 couple the Security Control Device 110 to the cellular service 115. Alternatively, as mentioned above, the Security Control Device 110 may also include a local network interface (not shown) such as a WiFi interface (and WiFi antenna) or Ethernet interface for establishing a local area network communication channel. The particular embodiment also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

A speaker 205 is also provided for generating audio. In one embodiment, the low power microcontroller 299 includes audio logic to generate audio on the speaker 205 to provide verbal feedback to the end user as the user enters selections via the input devices 210.

A wakeup receiver 207 is included in one embodiment to wake the Security Control Device from an ultra low power state in which it is consuming virtually no power. In one embodiment, the wakeup receiver 207 is configured to cause the Security Control Device 110 to exit this low power state in response to a wakeup signal received from a wakeup transmitter 207 configured on the Security Control Device 110 as shown in FIG. 2. In particular, in one embodiment, the transmitter 207 and receiver 207 together form an electrical resonant transformer circuit such as a Tesla coil. In operation, energy is transmitted via radio frequency signals from the transmitter 207 to the receiver 207 to wake the Security Control Device 110 from a very low power state. Because of the energy transfer, the Security Control Device 110 may be configured to consume virtually no power when it is in its low power state because it does not need to continually "listen" for a signal from the hub (as is the case with network protocols which allow devices to be awakened via a network signal). Rather, the microcontroller 200 of the Security Control Device 110 may be configured to wake up after being effectively powered down by using the energy electrically transmitted from the transmitter 207 to the receiver 207.

A local communication interface 213 and antenna 207 establishes local communication channels with each of the baby monitor 105. As mentioned above, in one embodiment, the local communication interface 213/antenna 207 implements the Bluetooth LE standard. However, the underlying principles of the invention are not limited to any particular protocols for establishing the local communication channels with the baby monitor 105. Although illustrated as separate units in FIG. 2, the WAN interface 212 and/or local communication interface 213 may be embedded within the same chip as the hardware logic 200.

In one embodiment, the Security Control Device 110 manages a continuous bi-directional stream of data between the baby monitor 105 and the internet 220. The Security Control Device may maintain an open TCP socket. The specific networking protocol used may be tweaked based on the needs of the baby monitor. For example, in some cases, where may not make sense to have a continuous bi-directional stream, a simple request/response protocol may be used to gather information when needed.

For security purpose, the Security Control Device 110 is designed to be not automatically upgradeable over the network. In particular, new updates may not be automatically downloaded and installed. This is to prevent hackers from altering user accounts and/or adding own usernames and passwords.

In one embodiment, the Security Control Device 110 is powered via A/C power. In particular, the Security Control Device 110 may include a power unit 290 with a transformer for transforming A/C voltage supplied via an A/C power cord to a lower DC voltage.

Figure 3:
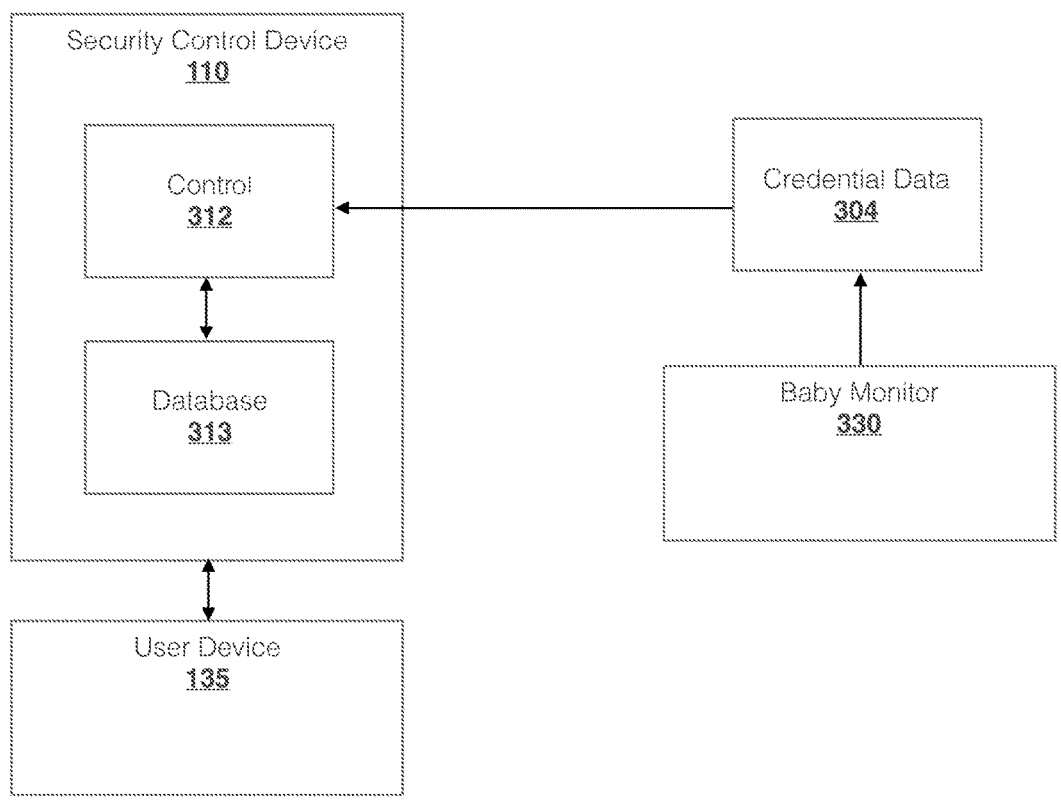
FIG. 3 illustrate embodiments of the invention for collecting data from a baby monitor, and generating notifications.

FIG. 3 illustrates one embodiment of the invention for performing security control operations. In particular, in this embodiment, a baby monitor 105 is equipped with authentication control logic that receives remotely transmitted user credentials, via either an app or browser installed on a user device 135. Control logic 312 executed on the Security Control Device 110 receives the credential data 304 from the internet, detects the authentication attempt, and responsively transmits the credential data to the baby monitor 105. The control logic 312 is programmed to record the credential data and the authentication event for forensic purpose. The detected event and credential data are stored in a database 313 on the Security Control Device 110.

In one embodiment, the Security Control Device 110 has an extremely small form factor and may be affixed on or near a respective baby monitor 330 using double-sided tape, a small nail, a magnetic attachment, etc.

In addition to recording authentication events, one embodiment of the Security Control Device 110 transmits notifications to the end user related to the report of authentication activities. The notifications may be displayed on the display of the Security Control Device 135. Alternatively, in one embodiment, the Security Control Device 135 provides touch buttons for playback 330. The user may trigger playback by a push of the touch buttons. Alternatively, the user input may be sent directly to the Security Control Device 110 from another user device 135.

If the Security Control Device determines occurrence of authentication event, then control logic 312 may transmit a notification to the end user's device 135 informing the user of the authentication attempt. In one embodiment, an app or browser-based code on the end user's device 135 displays the notification and provides the user with the ability to review the authentication event. It will communicate this information to the end user's device 135 (e.g., by sending a text message or app-specific notification).

One embodiment of the Security Control Device 110 is implemented with an extremely compact form factor (e.g., the size of a cell phone charger). For example, the Security Control Device 110 may be packaged as a 1.5 inch (or less) cube. Various alternate sizes are also contemplated such as a depth of between 1-2 inches (or less) and a height/length of between 1-3 inches or any cube having a side of 2 inches or less.

Figure 4A:
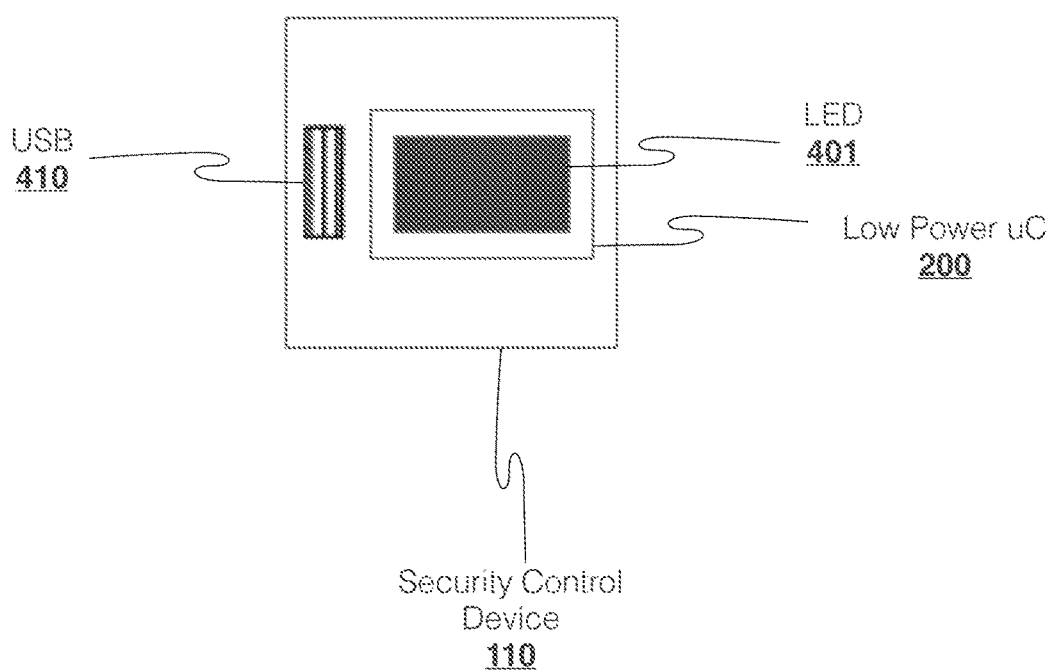
FIGS. 4A-B illustrate different embodiments of a miniature Security Control Device with LED lights and USB ports.
Figure 4B:
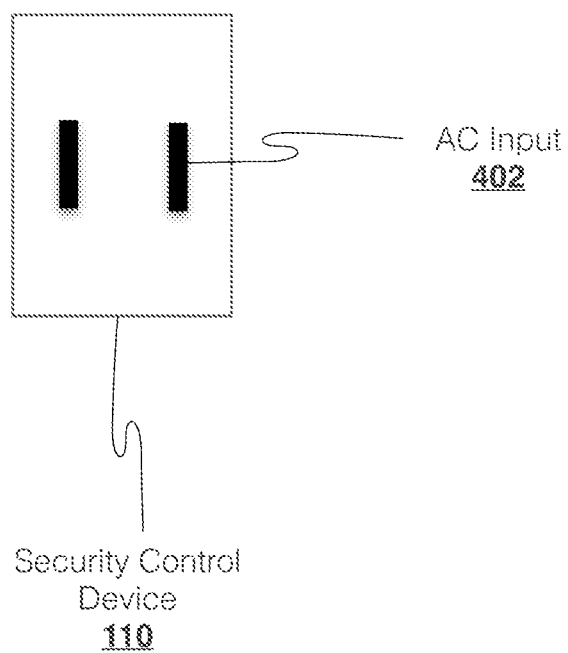

FIGS. 4A-B illustrate one particular embodiment in which the Security Control Device is integrated within a small package designed to be plugged directly into an A/C outlet via A/C input interface 402. In this manner, the Security Control Device 110 may be strategically positioned for ideal reception anywhere in the user's home where a power outlet exists. In one embodiment, the Security Control Device 110 includes a transformer for transforming the high voltage NC input into a lower voltage D/C signal. Although having a small form factor, in one embodiment, the Security Control Device 110 includes all of the features described herein for connecting with an ISP/WIFI router and with a baby monitor 105. For example, although not explicitly shown in FIGS. 4A-B, in one embodiment, the Security Control Device 110 may include a communication interface (e.g., antennas and software) for communicating with the baby monitor and the router. In one embodiment, the Security Control Device 110 includes a powerline communication (PLC) or similar network interface for establishing communication with the baby monitor 105 over the A/C power lines.

In addition, the embodiment of the Security Control Device shown in FIGS. 4A-B is equipped with light emitting diodes (LEDs) which, in addition to notifying the user of the current status of the security 110, may be used for a night-light. Thus, the user may place the Security Control Device in hallway, bathroom, or child's room and use the hub as a dual purpose night-light/Security Control Device.

In one embodiment, the user may program the night light feature via a programming interface on app or browser on the user's device 135. For example, the user may program the night light to come on at a particular time in the evening and to turn off at a particular time in the morning. In addition, in one embodiment, different, independently controlled colored LEDs are integrated the Security Control Device. The user may program the colors to be illuminated on the Security Control Device at different times of the day and evening.

Once programmed, LEDs 401 may be turned on/off by the Security Control Device's integrated low power uC 200. In one embodiment, the Security Control Device has an integrated photodetector to cause the night light to turn on in response to the ambient brightness falling below a specified threshold. In addition, in one embodiment, the Security Control Device has one or more integrated USB ports 410 to be used for charging other devices (e.g., such as the user's mobile device 135). Of course, the underlying principles of the invention are not limited to an Security Control Device 110 with integrated USB chargers.

In one embodiment of the invention, a user of the Security Control Device 110 may enter into agreements with multiple cell carriers 501 to provide connectivity to the Security Control Device 110 in different geographical regions. For example, in the United States the home user may have agreements with both Verizon and AT&T to provide Security Control Device connectivity. Consequently, an Security Control Device 110 may be in a location serviced by two or more supported cell carriers.

Figure 5:
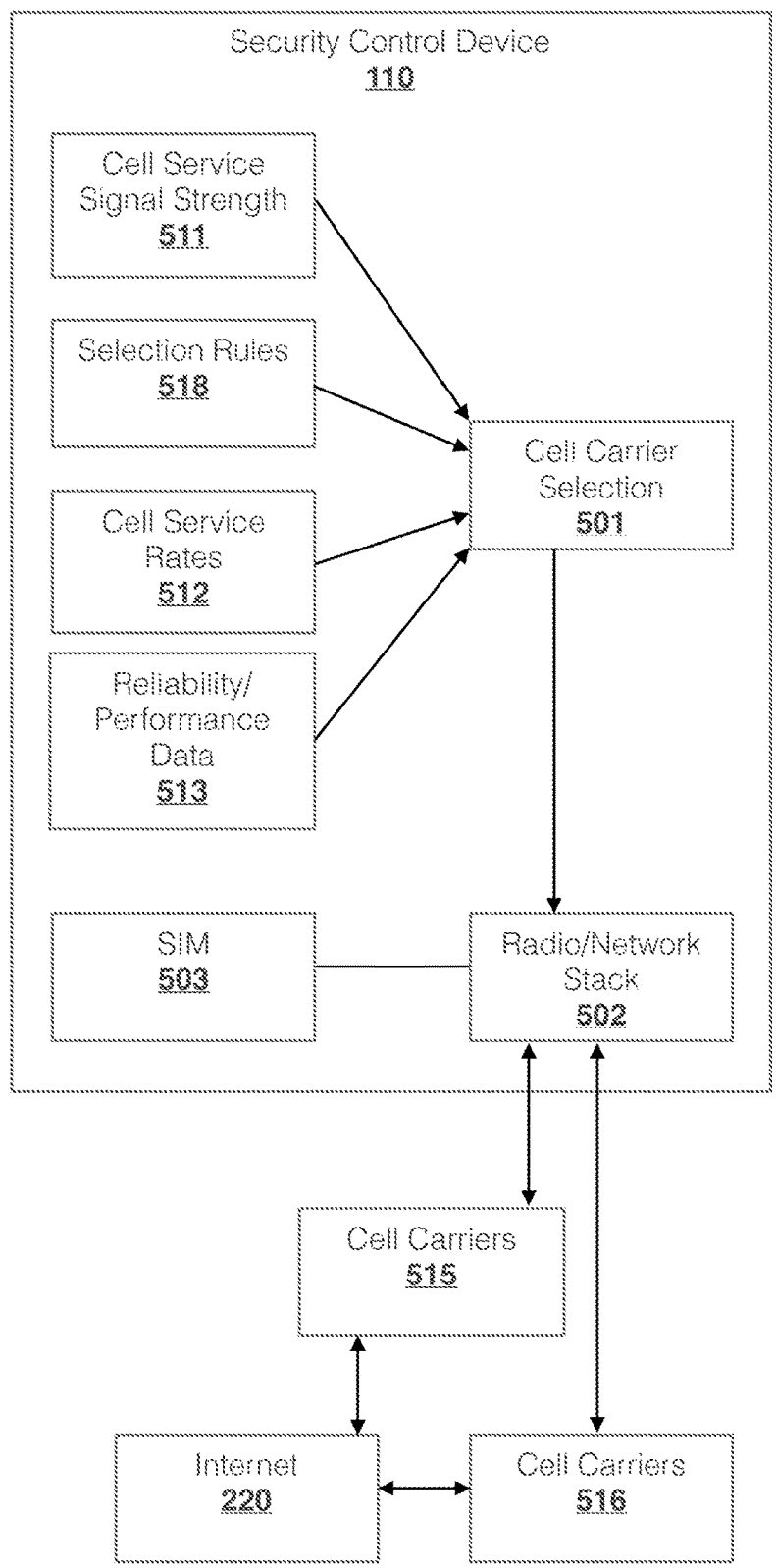
FIG. 5 illustrates one embodiment of a Security Control Device for selecting between different cell carriers.

As illustrated in FIG. 5, in one embodiment of the invention, the Security Control Device 501 includes cellular carrier selection logic 501 for selecting between two or more available cell carriers 515-516. In one embodiment, the cell carrier selection logic is programmed with a set of rules 518 for making the selection between the two or more cell carriers 515-516. Once a particular cell carrier has been selected, the cell carrier selection logic 501 instructs the radio/network stack 502 of the Security Control Device 110 to connect with that cell carrier.

Various different types of selection rules 518 may be implemented. By way of example, if the Security Control Device 110 has a more beneficial agreement with a first cell carrier 515 (e.g., a lower agreed-upon rate/cost 512) compared with a second cell carrier 516, then one rule may simply be to connect with the first cell carrier 515 assuming all other variables are equal or within specified thresholds (e.g., assuming that the second cell carrier's signal strength is sufficient).

In one embodiment, the selection rules 518 implemented by the cell carrier selection logic 501 may factor in other variables related to cell carrier connectivity and cost including, for example, the current or historical signal strength 511 of each cell carrier 515-516 measured at the Security Control Device 110. For example, even if the Security Control Device 110 has a more beneficial arrangement with the first cell carrier 515 as mentioned above, the cell carrier selection logic 501 may still connect to the second cell carrier 516 if the signal strength to the first carrier is below a specified threshold.

Similarly, the cell carrier selection logic 501 may evaluate reliability/performance data 513 of each of the cell carriers 515-516 when making a decision. For example, if the first cell carrier 515 is known to be unreliable in a particular region and/or provides significantly lower performance than the second cell carrier 516 (e.g., a reduced data rate), then the cell carrier selection logic 501 may select the second cell carrier (notwithstanding the more beneficial agreement with the first cell carrier). In one embodiment, the reliability/performance data 513 and the cell service signal strength data 511 may be collected over time by the Security Control Device 110. For example, the Security Control Device 110 may continually monitor signal strength, connection status, bandwidth, and other connection variables with each cell carrier 515-516 and may make connection decisions based (at least in part) on this recorded data.

In one embodiment, the Security Control Device 110 may be pre-provisioned to connect with all available cell carriers 515-516 (i.e., provided with a subscriber identity module (SIM) 503 or other authentication data needed for connecting with the cell carriers 515-516). In one embodiment, a single SIM 503 (or other authentication device) may be provisioned for multiple cell carriers 515-516, Thus, after selecting a first cell carrier 515 (e.g., based on the selection rules 518 and other variables), the Security Control Device 110 may still fall back to second cell carrier 516 if the first cell carrier 515 is unavailable. Similarly, the Security Control Device 110 may switch from the first cell carrier 515 to the second cell carrier 516 in response to changes in current conditions (e.g., a reduction in signal strength to the first cell carrier 515 and/or a reduction in cost for the second cell carrier 516).

Once the Security Control Device 110 is provisioned for the multiple carriers 515-516, it may dynamically switch between them throughout the day in accordance with changing parameters. For example, the cost associated with each cellular carrier 515-516 may change throughout the day (e.g., the first carrier 515 may be more expensive during heavy use periods such as rush hour and the second carrier 516 may be more expensive in the evenings). Similarly, the cell towers of one carrier may become overloaded during certain times of the day or evening, resulting in reduced connectivity. Using the techniques described herein, the cell carrier selection logic 501 may continually evaluate these conditions and dynamically switch between carriers as conditions change.

Figure 6:
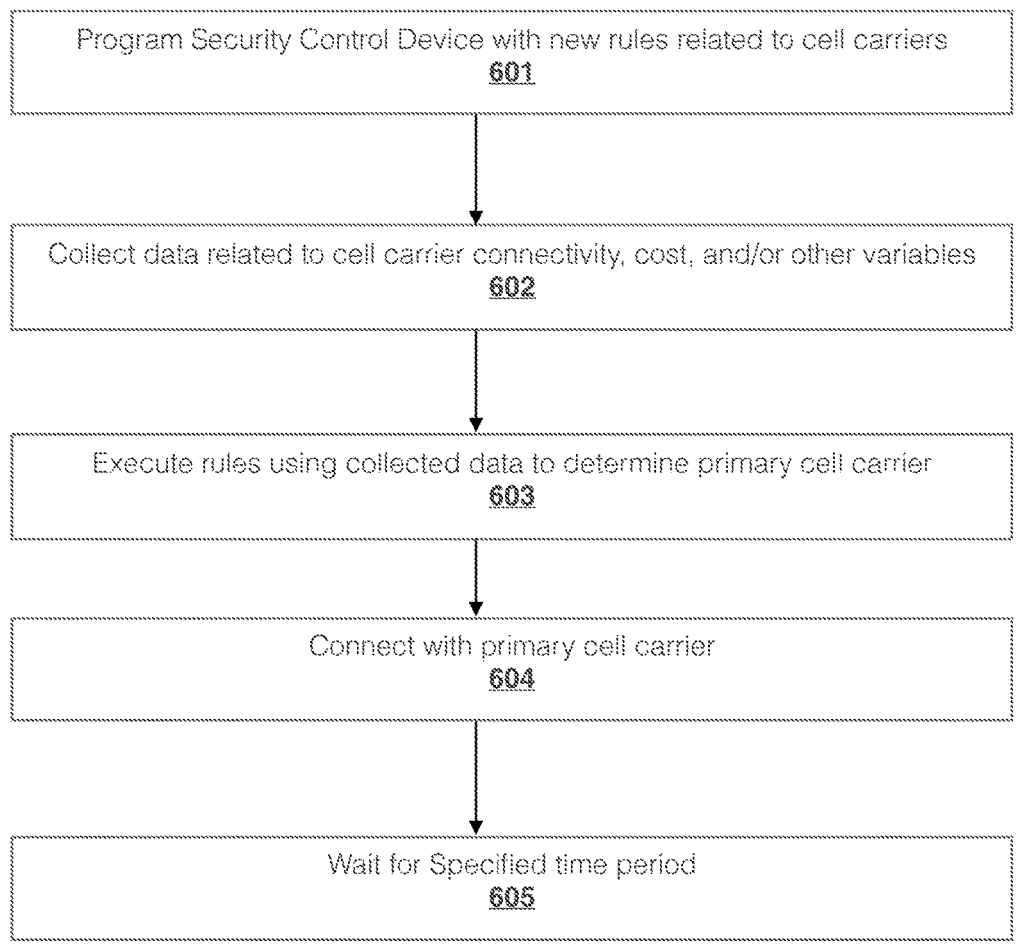
FIG. 6 illustrates one embodiment of a method for selecting between different cell carriers.

As illustrated in FIG. 6, at 601, the Security Control Device is provisioned for multiple cell carriers and programmed with rules related to connecting to the different cell carriers. For example, one rule may cause the Security Control Device to connect to a first service provider over a second service provider (all other variables being equal or within defined thresholds). At 602, data is collected related to cell carrier connectivity, cost, and/or other pertinent variables. For example, as discussed above, each cell carrier's signal strength may be used to render connection decisions.

At 603, the rules are executed using the collected data to determine the primary cell carrier to which to connect the Security Control Device. For example, all other variables being equal (or within specified thresholds), the Security Control Device may initially connect with the lower cost cell carrier. As mentioned, the initial primary cell carrier may be subsequently changed in response to changes in conditions and/or new/updated rules sent from the IoT service. At 604, the Security Control Device connects with the primary cell carrier, potentially using the secondary cell carrier as a fallback connection. The Security Control Device may then wait a specified time period at 605 (e.g., an hour, day, week, etc) during which the Security Control Device may collect additional data related to connectivity, cost, etc. After the delay, the process repeats and, if the rules/data has changed significantly, the Security Control Device may connect with a new primary cell carrier at 604.

In one embodiment, user behavior data collection logic executed on the Security Control Device 110 monitors and collects the information associated with each authentication activity (e.g., information provided to the baby monitor 105) as well as the connection properties of each user. For example, remote ip address of an incoming connection may be recorded for forensic purpose. Such an ip address can be valuable in reverse geolocation lookup to determine where a remote connection originates from. This is also done in real-time during which a connection is active to prevent a baby monitor from wiping out embedded logs upon powering off, and at the same time to increase accuracy of geolocation lookup of a dynamic ip address that may change between connecting user sessions.

What is claimed:

1. A miniature Security Control Device for reverse geo-location lookup based on ip address of incoming authentication to a baby monitor connected on the same LAN, wherein no internet connected services, mobile or Web applications are available through which the Security Control Device may be accessed and managed in order to protect the geo-location database from unauthorized hacking, the Security Control Device comprising:
    a hardware interlock for secure execution of authentication function and credential data in a separate memory area hidden from the operating system kernel;
    a housing having a compact form factor;
    a first network interface integrated within the housing to couple the Security Control Device to internet over a first communication channel;
    a second network interface integrated within the housing to couple the Security Control Device to a baby monitor over a second communication channel, the second communication channel being a local wireless communication channel;
    an alternating current (A/C) input interface to couple the miniature Security Control Device to an A/C power outlet;
    a transformer integrated within the housing to transform the A/C power from the A/C input interface into a lower voltage D/C signal; and
    at least one light emitting diode (LED) powered by the lower voltage D/C signal, the LED to notify a user of a current status of the Security Control Device and additionally configurable as a user-programmable night-light.

2. The Security Control Device as in claim 1 further comprising: a touch button configured to cause playback of authentication events recorded in the geo-location database.

3. The Security Control Device as in claim 1 wherein the housing comprises a 1.5 inch or smaller cube.

4. The Security Control Device as in claim 1 wherein the housing comprises a depth of between 1-2 inches or less and a height of between 1-3 inches.

5. The Security Control Device as in claim 1 further comprising: one or more universal serial bus (USB) ports providing a voltage and current usable for charging other electronic devices.

6. A secure reverse geolocation lookup method for determining geo-locations based on remote ip addresses of authentications to LAN-connected baby monitors, wherein the geo-locations are stored in a database, and no internet connected services, mobile or Web applications are allowed for accessing or managing in order to protect the geo-location database from unauthorized hacking, the method comprising:
    executing authentication function and credential data securely in a separate memory area defined via a hardware interlock, wherein the memory area is hidden from the operating system kernel;
    providing a miniature Security Control Device comprising a housing having a compact form factor;
    communicatively coupling the Security Control Device to internet over a first communication channel;
    communicatively coupling the Security Control Device to a baby monitor over a second communication channel, the second communication channel being a local wireless communication channel;
    electrically coupling the miniature Security Control Device to an alternating current (A/C) power outlet to receive A/C power via an integrated A/C input interface;
    transforming the NC power from the A/C input interface into a lower voltage D/C signal;
    powering at least one light emitting diode (LED) with the lower voltage D/C signal; and
    notifying a user of a current status of the Security Control Device with the LED and additionally executing program code to program the LED to be a programmable night-light.

7. The method as in claim 6 further comprising providing a touch button for causing playback of authentication events recorded in the geo-location database.

8. The method as in claim 6 wherein the housing comprises a 1.5 inch or smaller cube.

9. The method as in claim 6 wherein the housing comprises a depth of between 1-2 inches or less and a height of between 1-3 inches.

10. The method as in claim 6 further comprising providing one or more universal serial bus (USB) ports on the Security Control Device for providing a voltage and current usable for charging other electronic devices.

* * * * *